Patented Apr. 21, 1931                                                                1,801,942

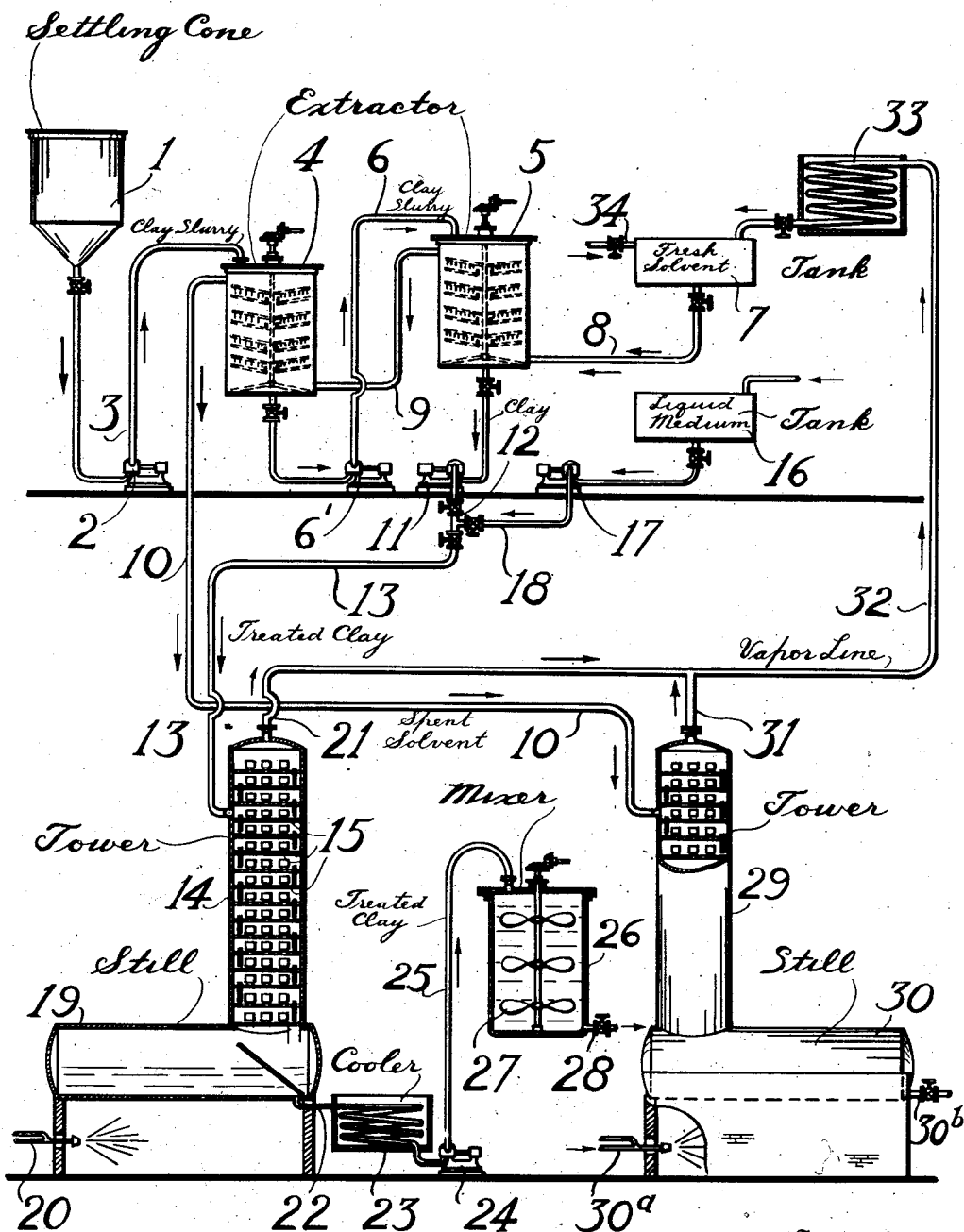

UNITED STATES PATENT OFFICE

REGINALD K. STRATFORD AND GORDON McINTYRE, OF SARNIA, ONTARIO, CANADA, ASSIGNORS TO STANDARD OIL DEVELOPMENT COMPANY, A CORPORATION OF DELAWARE

METHOD FOR REVIVIFYING TREATING AGENTS

Application filed February 8, 1929. Serial No. 338,421.

This invention relates to improvements in the recovery or revivification of finely divided solid treating materials, especially clays, fuller's earth, silica gel, activated carbon, and the like, used in the purification of mineral oils. Principal objects are to provide an extraction system in which volatile extraction agents may be used without substantial loss and the solid treating material may be discharged ready for reuse without drying. The invention will be described in connection with the recovery of spent clay from the processing of cracked petroleum oil distillates, but it will be understood that this description is merely illustrative.

In a preferred form, our improvements comprise extracting the finely divided solid in a substantially closed system with a volatile solvent or volatile extraction agent. The volatile agent is recovered by rectification while the clay charged with it is suspended in a liquid medium. The clay is withdrawn with the liquid medium and may be reused directly.

In the accompanying drawing, the figure is a diagrammatic vertical section of equipment suitable for use in carrying out our method.

In this drawing, 1 denotes a source of spent clay, for example the settling cone of a tower in which clay has been used as a countercurrent treating agent, as set forth in Canadian Patent No. 278,013, granted February 21, 1928, by Reginald K. Stratford. The clay is in the form of a slurry with oil or other suitable carrier.

A pump 2 forwards the slurry through a line 3 from the bottom of the settling cone to an extractor 4, which is preferably in the form of a thickener or similar contact device. We have shown a second extractor 5 connected by line 6, in which is installed a pump 6', to extractor 4, but it will be understood that the number of these devices may be varied.

The extraction agent is drawn from a tank 7 through line 8 to the lower part of extractor 5. The extraction agent passes from the upper part of extractor 5 through a line 9 to the lower part of extractor 4, through it, and out at the top by line 10.

A pump 11 forwards the clay, together with the extraction agent which adheres to it, through lines 12 and 13 into the upper part of a rectifying tower 14. This has bell cap plates 15 of the usual form, or other vapor liquid contact means. A liquid medium, such as heavy naphtha, is fed from tank 16 into the stream of clay. A pump 17 in line 18 forwards the liquid medium into line 13.

Tower 14 is in communication at the bottom with a still 19. This is heated by a burner 20 sufficiently to expel substantially all the extraction agent through a vapor line 21, leaving the clay in admixture with the heavy naphtha. The clay and naphtha pass by a line 22 into a cooler 23 from which pump 24 forwards them by a line 25 into a mixer 26. This has paddles or the like 27. The mixture may be drawn off through a line 28 and used as such for treating a further quantity of oil.

The charged extraction agent flowing from the first extractor 4 through line 10 is run into the upper part of a rectifying tower 29 mounted on a still 30. The still is fired at 30a and has a residue draw-off line 30b. Vapors of the extraction agent pass through a line 31 into a line 32, which also receives vapors from vapor line 21 of tower 14. The combined stream of vapors passes through a condenser 33 and the condensate flows into tank 7. Fresh extraction agent may be supplied to the tank through line 34.

The following example is illustrative of our invention.

Cracked naphtha is treated with Attapulgus clay and the spent clay—cracked naphtha slurry is pumped in series through extractors 4 and 5. A mixture of equal parts of ethyl alcohol and benzol is run counter-current to the clay through the extractors.

Most of the cracked naphtha is carried forward by the organic solvents, together with gummy substances and other impurities extracted from the clay. The extracted clay and associated solvent are pumped into rectifying tower 14, together with heavy naphtha from tank 16. In this tower the alcohol and benzol are distilled while the clay is in suspension in the heavy naphtha.

Still 19 is heated to a temperature sufficient to expel substantially all the alcohol and benzol, without causing naphtha vapors to pass in any quantity through vapor line 21. The clay and naphtha are drawn off through cooler 23 into mixing tank 26 and thence to a clay treating tower or other equipment for purifying a further quantity of oil.

The alcohol-benzol mixture containing oil and impurities dissolved from the clay, is passed from the upper part of the first extractor 4 into rectifying tower 29. There it is separated from the oil and impurities. The solvent vapors are passed to condenser 33 and tank 7 for re-use. Either or both of the extractors may be heated, for example to about 140° F., to facilitate the solution or extraction of impurities from the clay.

Simple rectification equipment of the type shown is adequate for most purposes, but it will be understood that any desired refinement may be made to secure particular results. For example, the pressure in the tower may be controlled at above or below atmospheric, steam or gas may be used in stripping the extracting agent from the clay mixture, etc.

With the counter-current extraction described, the equipment may be operated with a relatively small volume of extraction agent. Handling losses are reduced to a minimum since the clay is at no time separated, but is carried through its cycle in a liquid medium.

The ethyl alcohol-benzol mixture described is, in general, most effective, but we do not wish to be limited to the use of this particular solvent. Numerous others may be used under certain conditions, for example, acetone, methyl alcohol, benzol or ethyl alcohol alone, or the like.

Various changes and alternative arrangements may be made within the scope of the appended claims in which it is our intention to claim all novelty inherent in the invention as broadly as the prior art permits.

We claim:

1. In a method of revivifying finely divided solid material used in the purification of liquids, the improvement which comprises extracting the material with a volatile solvent, removing solvent from the extracted material in the presence of a liquid medium, and recovering the solvent and extracted material.

2. In a method of recovering finely divided solid material used in the purification of liquids, the improvement which comprises extracting the material with a volatile solvent, suspending the extracted material in a liquid medium, subjecting the resulting mixture to rectifying conditions, whereby the volatile solvent adhering to the material is expelled, and recovering the solvent and extracted material.

3. In a method of recovering finely divided solid materials used in the purification of liquids, the improvement which comprises passing a volatile solvent counter-current to the spent finely divided material, passing the extracted material together with adhering solvent into the upper part of a rectifying zone, suspending the extracted material in said zone by means of a relatively high boiling liquid, taking off vapors of the solvent from the rectifying zone, and withdrawing the extracted material therefrom together with the carrying liquid.

4. Method according to claim 3, in which the finely divided material is extracted with a mixture of ethyl alcohol and benzol, and the carrying liquid is heavy naphtha.

5. Method of recovering clay used in the purification of mineral oils, which comprises extracting the clay with a voltaile solvent in a closed system, including a rectifying zone in which the solvent adhering to the clay is removed by rectification while the clay in suspended in a relatively non-voltaile carrying liquid.

REGINALD K. STRATFORD.
GORDON McINTYRE.